(12) United States Patent
Xu et al.

(10) Patent No.: US 11,467,283 B2
(45) Date of Patent: Oct. 11, 2022

(54) LASER RANGING DEVICE

(71) Applicant: SHANGHAI SLAMTEC CO., LTD., Shanghai (CN)

(72) Inventors: Ci Xu, Shanghai (CN); Yingchun Wang, Shanghai (CN); Banghui Pan, Shanghai (CN); Yichun Liu, Shanghai (CN); Shikai Chen, Shanghai (CN); Yuxiang Li, Shanghai (CN); Ling Lin, Shanghai (CN); Jueshen Huang, Shanghai (CN)

(73) Assignee: SHANGHAI SLAMTEC CO., LTD., Shanghai (CN)

( * ) Notice: Subject to any disclaimer, the term of this patent is extended or adjusted under 35 U.S.C. 154(b) by 542 days.

(21) Appl. No.: 16/072,892

(22) PCT Filed: Dec. 9, 2016

(86) PCT No.: PCT/CN2016/109316
§ 371 (c)(1),
(2) Date: Jul. 26, 2018

(87) PCT Pub. No.: WO2017/140163
PCT Pub. Date: Aug. 24, 2017

(65) Prior Publication Data
US 2019/0033449 A1    Jan. 31, 2019

(30) Foreign Application Priority Data
Feb. 17, 2016    (CN) .......................... 201610089325.0

(51) Int. Cl.
| G01S 17/08 | (2006.01) |
| G01S 7/481 | (2006.01) |
| G01S 7/497 | (2006.01) |
| G01S 17/42 | (2006.01) |

(52) U.S. Cl.
CPC .............. G01S 17/08 (2013.01); G01S 7/481 (2013.01); G01S 7/4811 (2013.01);
(Continued)

(58) Field of Classification Search
CPC ......... G01V 8/10; G01S 17/42; G01S 7/4813; G01S 7/4817; G01S 17/04; G01S 17/08; G01S 7/481; G01S 7/4811; G01S 7/4972
See application file for complete search history.

(56) References Cited

U.S. PATENT DOCUMENTS

| 2010/0163716 A1* | 7/2010 | Villaret ................ G01D 5/3473 |
| | | 250/227.28 |
| 2012/0242162 A1* | 9/2012 | Hsu ........................ H02J 50/70 |
| | | 307/104 |

(Continued)

FOREIGN PATENT DOCUMENTS

| CN | 1651932 A | 8/2005 |
| CN | 102751792 A | 10/2012 |

(Continued)

*Primary Examiner* — Luke D Ratcliffe
(74) *Attorney, Agent, or Firm* — Bayramoglu Law Offices LLC

(57) ABSTRACT

A laser ranging device includes a laser transceiving apparatus, a rotation apparatus, and a power supply control apparatus. The laser transceiving apparatus is used for transmitting a projection beam to a target to be measured and receiving a reflection beam reflected by the target to be measured. As there are no problems of the reflectivity of the reflector itself and the angle offset of the reflection beam, the light utilization is effectively improved. The rotation apparatus drives the laser transceiving apparatus to rotate by electromagnetic induction transmission, making the laser ranging device smaller in size. The power supply control apparatus supplies power to the rotation apparatus, increasing the service life of the laser ranging device, and the power (Continued)

supply control apparatus transmit data with the laser transceiving apparatus through photoelectric conversion.

13 Claims, 2 Drawing Sheets

(52) U.S. Cl.
CPC .......... *G01S 7/4813* (2013.01); *G01S 7/4817* (2013.01); *G01S 7/4972* (2013.01); *G01S 17/42* (2013.01)

(56) References Cited

U.S. PATENT DOCUMENTS

2015/0219763 A1* 8/2015 Nubling .................. G01V 8/10 250/221

2017/0063100 A1* 3/2017 Jungwirth .............. H05B 47/11

FOREIGN PATENT DOCUMENTS

| | | |
|---|---|---|
| CN | 204535690 U | 8/2015 |
| CN | 105277944 A | 1/2016 |
| CN | 105738912 A | 7/2016 |
| CN | 105785383 A | 7/2016 |
| CN | 105785384 A | 7/2016 |
| CN | 105807283 A | 7/2016 |
| CN | 105866785 A | 8/2016 |
| CN | 205507083 U | 8/2016 |
| CN | 106019293 A | 10/2016 |
| EP | 2549290 A1 | 1/2013 |
| JP | 2015132600 A * | 7/2015 ........... G01S 7/4817 |

* cited by examiner

LASER RANGING DEVICE

CROSS REFERENCE TO RELATED APPLICATIONS

This application is the national phase entry of International Application PCT/CN2016/109316, filed on Dec. 9, 2016, the entire contents of which are incorporated herein by reference.

TECHNICAL FIELD

The present invention relates to a ranging device, in particular to a laser ranging device.

BACKGROUND

Laser rangefinder is an instrument that measures the distance to a target accurately by laser. The laser rangefinder emits a very thin laser beam towards the target to be measured. A photoelectric component receives the laser beam reflected from the target. A timer measures the time from emission to reception of the laser beam and calculates the distance from the observer to the target to be measured. The Laser rangefinder is widely used in many fields such as construction and exploration because of the advantages of convenient use, accurate measurement and short measurement time. The above is the principle of Time of Flight (TOF) laser radar ranging, but a TOF radar needs complex opto-electromechanical components, which lead to huge volume and high cost.

In the prior art, a miniature optical scanning ranging device using a triangular ranging method is used in consideration of size and cost. The miniature optical scanning ranging device installs the laser, the imaging lens, the photographic chip, etc. which are used for realizing triangular ranging on a continuously rotatable platform to realize the scanning of the ranging light beam. As the use of complex optical lenses is avoided, the size and cost of the ranging device are effectively reduced. In order to realize the power supply and communication to rotating parts, such devices need to use apparatuses like conductive slip rings that can realize the electrical signal transmission between rotating bodies, transmission modes of belts or gears to drive the rotation bodies to rotate. By doing so, the service life of such a device is greatly affected. Generally, mechanical wear and aging will appear and cause failure after the device continues to work for a year.

Therefore, laser rangefinders in the prior art use slip rings to transfer electrical energy and electrical signals, and use transmission modes of belts or gears to rotate the rotation bodies, leading to shortcomings of short service life and large volume of the laser rangefinders. These shortcomings need new technology to improve.

SUMMARY

The objective of the present invention is to provide a laser ranging device to solve the problem of short service life and huge volume of the laser rangefinder caused by use of slip rings to achieve power supply and communication and use of a belt transmission mode or a gear transmission mode to rotate the transceiving apparatus.

According to an aspect of the present invention, a laser ranging device includes a laser transceiving apparatus, a rotation apparatus, and a power supply control apparatus. The laser transceiving apparatus is used for transmitting a projection beam to a target to be measured and receiving the reflection beam reflected by the target to be measured. The rotation apparatus drives the laser transceiving apparatus to rotate by electromagnetic induction transmission. The power supply control apparatus wirelessly supplies power to the rotation apparatus and transmits data with the laser transceiving apparatus by photoelectric conversion.

Further, the rotation apparatus includes a stator coil, a rotor, a fixed unit and a rotation unit. The stator coil is fixedly connected to the fixed unit, and the stator coil acquires an alternating current provided by the power supply control apparatus to drive the rotor to rotate by electromagnetic induction transmission. The rotation unit is fixedly connected to the rotor and the laser transceiving apparatus for driving the laser transceiving apparatus to rotate.

Further, the fixed unit is connected to the rotation unit in a fitting manner by a bearing.

Further, the rotation apparatus includes a rotation number calculation unit for obtaining the number of rotations of the rotation apparatus and calculating the rotation speed of the rotation apparatus based on the number of rotations.

Further, the rotation apparatus includes the rotation number calculation unit including encoding teeth arranged on the fixed unit, the encoding teeth includes at least one of square encoding teeth, rectangular encoding teeth, conical encoding teeth, polygonal encoding teeth, and circular encoding teeth.

Further, the laser transceiving apparatus includes an information generating unit for generating related ranging information based on the projection beam and the corresponding reflection beam, and an information transceiving unit for performing a full duplex data transmission with the power supply control apparatus by photoelectric conversion.

Further, the information transceiving unit includes a first light emitting component for generating first optical signals based on the related ranging information to the power supply control apparatus; a first photosensitive component for acquiring second optical signals transmitted by the power supply control apparatus based on the transmission control information and converting into corresponding control electrical information. The transmission control information is used to control the laser transceiving apparatus to transmit the projection beam to the target to be measured.

Further, the power supply control apparatus includes a second light emitting component for transmitting the second optical signals to the laser transceiving apparatus, and a second photosensitive component for acquiring the first optical signals and converting into corresponding related ranging electrical information.

Further, the laser ranging device includes a data transmission apparatus for transmitting related ranging electrical information received by the power supply control apparatus to an external device and transmitting the governing signal transmitted by the external device to the power supply control apparatus to control the power supply control apparatus to regulate the rotation speed of the rotation apparatus based on the governing signal.

Further, the laser ranging device includes a power supply apparatus of the laser transceiving apparatus. The power supply apparatus of the laser transceiving apparatus acquires the alternating current provided by the power supply control apparatus and supplies power to the laser transceiving apparatus based on the alternating current.

Further, the power supply apparatus of the laser transceiving apparatus includes an outer coil and an inner coil. The outer coil is fixed to the power supply control apparatus and used for acquiring the alternating current provided by the power supply control apparatus. The inner coil is fixed to the laser transceiving apparatus and used for electrically connecting to the laser transceiving apparatus. The inner coil generates an induced electromotive force based on the induced electromagnetic field generated by the outer coil and supplies power to the laser transceiving apparatus.

Further, the power supply control apparatus includes a rotation speed regulation unit for regulating a speed control signal provided for the rotation apparatus to control the speed of rotation of the rotation apparatus.

Further, the power supply control apparatus includes a switch unit for switching the regulation mode of the rotation speed of the rotation apparatus.

Further, the laser ranging device includes a wired power supply apparatus for supplying power to the power supply control apparatus.

Compared with the prior art, the laser ranging device provided by an aspect of the present invention includes a laser transceiving apparatus, a rotation apparatus, and a power supply control apparatus. The laser transceiving apparatus is used for transmitting the projection beam to the target to be measured and receiving the reflection beam reflected by the target to be measured. Due to the structure design without a reflector, the problems of the reflectivity of the reflector itself and the angle offset of the reflection beam are avoided, and the light utilization is effectively improved. The rotation apparatus drives the laser transceiving apparatus to rotate by electromagnetic induction transmission, which replaces the design structure of the belt transmission mode or the gear transmission mode, so that the laser ranging device is smaller in size. The power supply control apparatus wirelessly supplies power to the rotation apparatus without mechanical contact and transmits data with the laser transceiving apparatus by photoelectric conversion, thereby avoiding the problem of short service life of the slip ring power supply and data transmission in the prior art and effectively increasing the service life of the laser ranging device.

BRIEF DESCRIPTION OF THE DRAWINGS

With reference to the detailed description of non-limiting embodiments by the following drawings, other features, objects and advantages of the present invention will become more apparent.

The same or similar reference numerals in the drawings represent for the same or similar components.

DETAILED DESCRIPTION

The present invention will be further described in detail below through specific embodiments.

It should be noted that the following embodiments are merely preferred embodiments of the present invention. Any other embodiment derived from the embodiments of the present invention by those skilled in the art without creative effort shall also fall within the scope of the present invention.

Figure 1:
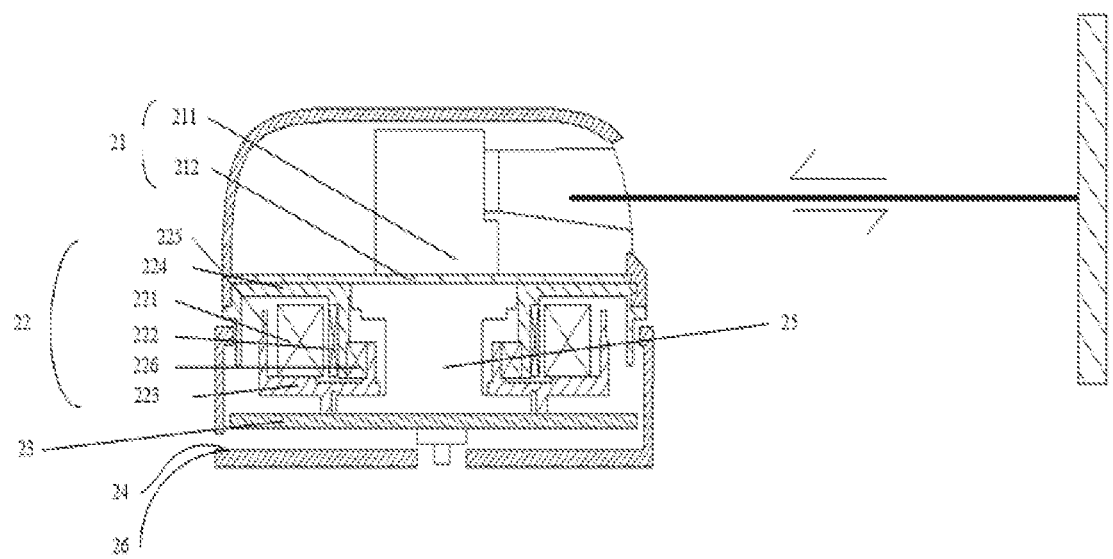
FIG. 1 is a structural schematic view of the laser ranging device according to an aspect of the present invention.

FIG. 1 is a structural schematic view of the laser ranging device according to an aspect of the present invention. The laser ranging device in FIG. 1 includes laser transceiving apparatus 21, rotation apparatus 22, and power supply control apparatus 23. Laser transceiving apparatus 21 is used for transmitting a projection beam to a target to be measured and receiving the reflection beam reflected by the target to be measured. Rotation apparatus 22 drives laser transceiving apparatus 21 to rotate by electromagnetic induction transmission. Power supply control apparatus 23 wirelessly supplies power to rotation apparatus 22 and transmits data with laser transceiving apparatus 21 by photoelectric conversion.

It should be noted that laser transceiving apparatus 21 includes a laser transmission unit and a laser reception unit. The laser transmission unit includes but is not limited to a laser transmitter. The laser reception unit includes but is not limited to a laser receiver. In embodiments of the present invention, the laser transmission unit is preferably the laser transmitter, and the laser reception unit is preferably the laser receiver. Certainly, those skilled in the art may understand that the laser transmitter is merely a preferred embodiment of an aspect of the laser transmission unit, and the laser receiver is merely a preferred embodiment of an aspect of the laser reception unit. Other existing or future possible laser transmission units and laser reception units applicable to the present invention shall also fall within the scope of the present invention and be included herein by reference.

It should be noted that power supply control apparatus 23 includes but is not limited to a drive transmitting board. The drive transmitting board includes a drive transmitting printed circuit board (PCB), and an application specific integrated circuit (ASIC), a field programmable gate array (FPGA), a digital signal processor (DSP) or an embedded equipment, etc. In a preferred embodiment of the present invention, power supply control apparatus 23 is preferably a drive transmitting printed circuit board. Certainly, those skilled in the art may understand that the drive transmitting printed circuit board is merely a preferred embodiment of an aspect of power supply control apparatus 23. Other existing or future possible power supply control apparatuses 23 applicable to the present invention shall also fall within the scope of the present invention and be included herein by reference.

In a preferred embodiment of the present invention, a certain angle exists between the laser transmitter in laser transceiving apparatus 21 and the laser receiver in laser transceiving apparatus 21. Laser transmitter in transceiving apparatus 21 transmits a projection beam to the target to be measured. The projection beam is parallel to the rotation surface of rotation apparatus 22. After the projection beam reaches the target to be measured, the reflected reflection beam is received by the laser receiver in laser transceiving apparatus 21. Namely, the laser receiver in laser transceiving apparatus 21 receives the reflection beam reflected by the target to be measured. Due to the structure design of laser transceiving apparatus 21 without a reflector, the problems of the reflectivity of the reflector itself and the angle offset of the reflection beam are avoided, and the light utilization is effectively improved. Rotation apparatus 22 drives laser transceiving apparatus 21 to rotate by electromagnetic induction transmission, which replaces the design structure of the belt transmission mode or the gear transmission mode, so that the service life of the laser ranging device is increased, and the volume and noise of the laser ranging device are reduced. Power supply control apparatus 23 wirelessly supplies power to rotation apparatus 22 and transmits data with the laser transceiving apparatus 21 by photoelectric conversion, thereby avoiding the problem of short service life of the slip ring power supply and data transmission in the prior art and effectively increasing the service life of the laser ranging device.

In the above-mentioned preferred embodiment of the present invention, the projection beam transmitted by the laser transmitter to the target to be measured includes but is not limited to a laser. Certainly, other existing or future possible projection beam for being transmitted to the target to be measured applicable to the present invention shall also fall within the scope of the present invention and be included herein by reference.

Further, the rotation apparatus 22 includes stator coil 221, rotor 222, fixed unit 223 and rotation unit 224. Stator coil 221 is fixedly connected to fixed unit 223, and stator coil 221 acquires the alternating current provided by the power supply control apparatus 23 to drive rotor 222 to rotate by electromagnetic induction transmission. The rotation unit 224 is fixedly connected to rotor 222 and laser transceiving apparatus 21 for driving laser transceiving apparatus 21 to rotate.

It should be noted that the fixed unit includes but is not limited to a fixed platform. The rotation unit includes but is not limited to a rotation platform. In a preferred embodiment of the present invention, the fixed unit is preferably a fixed platform, the rotation unit is preferably a rotation platform. Certainly, those skilled in the art may understand that the fixed platform is merely a preferred embodiment of an aspect of the fixed unit, and the rotation platform is merely a preferred embodiment of an aspect of the rotation unit. Other existing or future possible fixed units and rotation units applicable to the present invention shall also fall within the scope of the present invention and be included herein by reference.

It should be noted that rotor 222 includes but is not limited to a magnetic pole or magnetic steel. In a preferred embodiment of the present invention, the rotor 222 is preferably a magnetic pole. Certainly, those skilled in the art may understand that the magnetic pole is merely a preferred embodiment of an aspect of the rotor. Other existing or future possible rotors applicable to the present invention shall also fall within the scope of the present invention and be included herein by reference.

Figure 2:
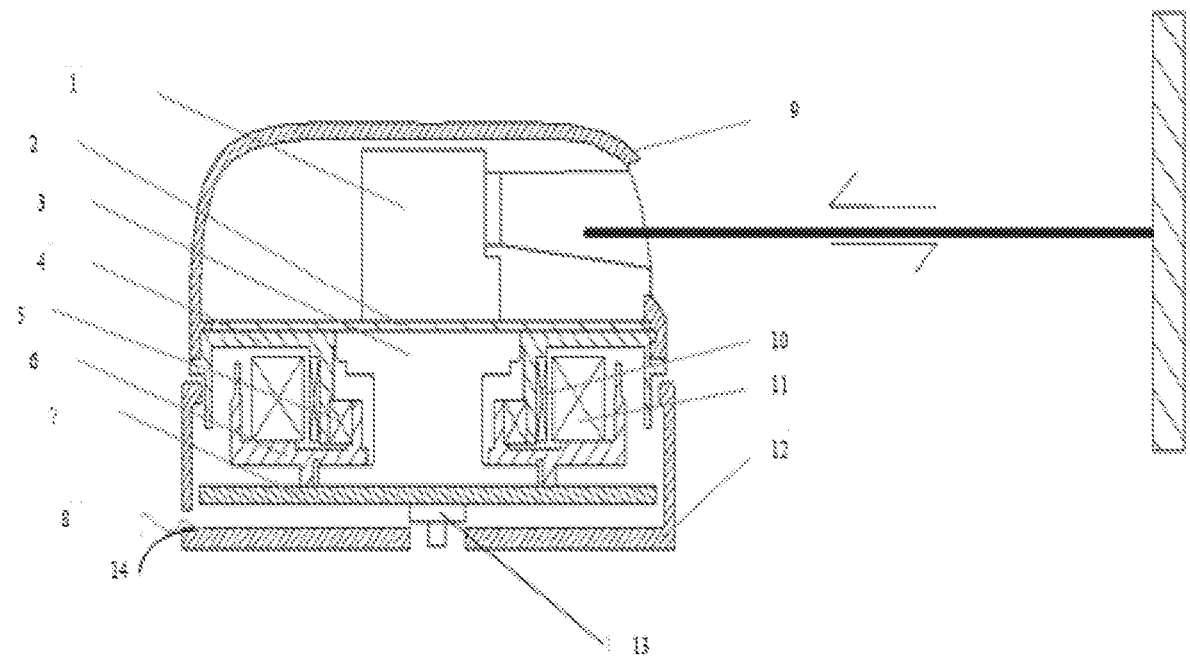
FIG. 2 shows an electromagnetic induction transmission mode 1 of the laser ranging device according to an aspect of the present invention.
Figure 3:
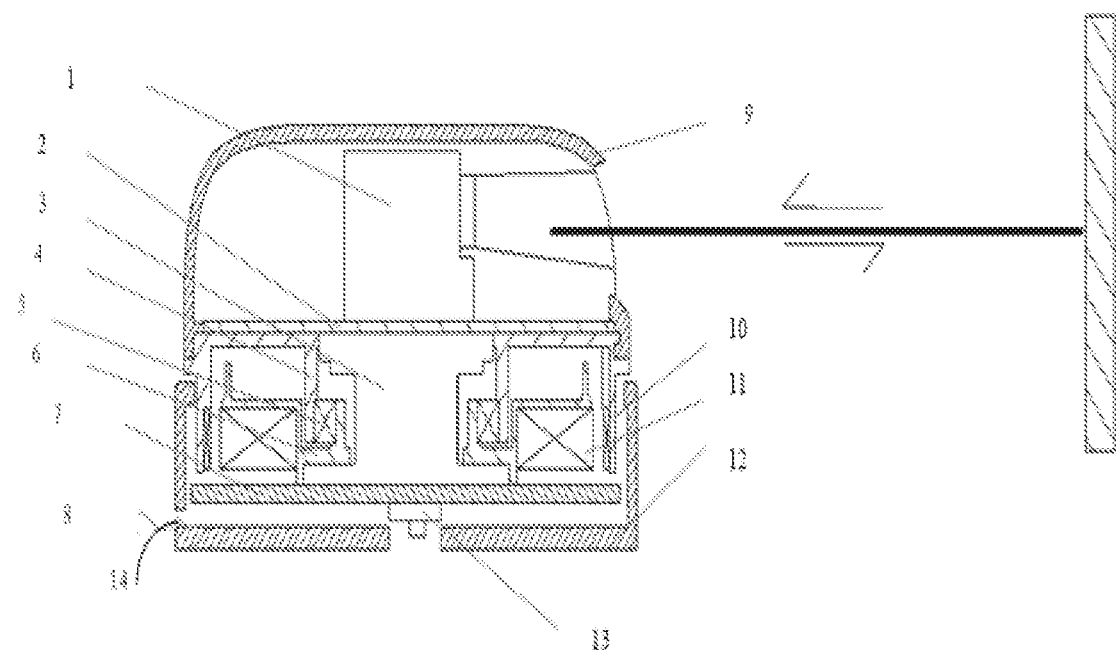
FIG. 3 shows an electromagnetic induction transmission mode 2 of the laser ranging device according to an aspect of the present invention.

Optionally, stator coil 221 drives rotor 222 to rotate by electromagnetic induction transmission. Stator coil 221 is fixedly connected to fixed unit 223 and the rotor is fixedly connected to the rotation unit. There are two electromagnetic induction transmission modes between stator coil 221 and rotor 222. FIG. 2 shows electromagnetic induction transmission mode 1 of the laser ranging device according to an aspect of the present invention. As shown in FIG. 2, in electromagnetic induction transmission mode 1, the outer ring of rotation apparatus 22 is provided with the stator coil fixedly connected to fixed unit 223. The inner ring of rotation apparatus 22 is provided with the rotor fixedly connected to rotation unit 224. FIG. 3 shows electromagnetic induction transmission mode 2 of the laser ranging device according to an aspect of the present invention. As shown in FIG. 3, in electromagnetic induction transmission mode 2, the inner ring of rotation apparatus 22 is provided with the stator coil fixedly connected to fixed unit 223. The outer ring of rotation apparatus 22 is provided with the rotor fixedly connected to rotation unit 224. Certainly, those skilled in the art may understand that the above-mentioned electromagnetic induction transmission modes between the stator coil and the rotor are merely preferred embodiments of the present invention. Other existing or future possible electromagnetic induction transmission modes between the stator coil and the rotor applicable to the present invention shall also fall within the scope of the present invention and be included herein by reference.

Further, the fixed unit 223 is connected to the rotation unit 224 in a fitting manner by a bearing.

For example, in preferred embodiments of the present invention, the fixed platform is connected to the rotation platform in a fitting manner by a bearing.

In the above-mentioned preferred embodiments of the present invention, stator coil 221 acquires the regularly changing alternating current provided by the power supply control apparatus 23, generates an induced magnetic field through the electromagnetic induction principle, and couples with rotor 222 to form a torque force, realizing an electromagnetic induction transmission mode to drive rotor 222 to rotate. Rotor 222 is fixedly connected to the rotation platform for driving the rotation platform to rotate by the rotor 222 rotated by the electromagnetic induction transmission mode. Since laser transceiving apparatus 21 is fixedly connected to the rotation platform, rotor 222 drives laser transceiving apparatus 21 and the rotation platform to rotate together, avoiding the mechanical contact and friction caused by the belt transmission mode or the gear transmission mode, effectively increasing the service life of the laser ranging device, and reducing the volume of the laser ranging device and the noise effect caused by the belt transmission mode and the gear transmission mode.

Further, the rotation apparatus 22 includes a rotation number calculation unit 225 for obtaining the number of rotations of the rotation apparatus 22, and calculating the rotation speed of the rotation apparatus based on the number of rotations.

It should be noted that rotation speed includes but is not limited to a rotation angular velocity and a rotation frequency. Certainly, those skilled in the art may understand that other existing or future possible rotation speeds applicable to the present invention shall also fall within the scope of the present invention and be included herein by reference.

It should be noted that the rotation number calculation unit 225 includes but is not limited to a cooperation calculation unit between gears and an encoding calculation unit between a gear and an encoder. Certainly, those skilled in the art may understand other existing or future possible rotation number calculation units for obtaining the rotation number of the rotation apparatus applicable to the present invention shall also fall within the scope of the present invention and is included herein by reference.

Preferably, rotation apparatus 22 includes rotation number calculation unit 225 having encoding teeth arranged on the fixed unit, the encoding teeth includes at least one of square encoding teeth, rectangular encoding teeth, conical encoding teeth, polygonal encoding teeth, or circular encoding teeth.

In a preferred embodiment of the present invention, the rotation number calculation unit 225 includes rectangular encoding teeth arranged on the fixed platform. The rectangular encoding teeth obtains the rotation number of the rotation platform in rotation apparatus 22 by cooperating with an encoder in rotation number calculation unit 225, and calculates the rotation angular velocity or frequency of the rotation platform based on the ratio of the rotation number and the time. For example, the area of each encoding tooth in a circle of the encoding teeth is the same, except for an encoding tooth at a special position. The encoding tooth is smaller than other encoding teeth and at a special position, so that rotation apparatus 22 knows that itself has rotated a circle, then a proportional operation is performed with time to calculate the rotation angular velocity or the rotation frequency of the rotation apparatus 22.

Further, laser transceiving apparatus 21 includes information generating unit 211 for generating related ranging information based on the projection beam and the corresponding reflection beam, and information transceiving unit 212 for performing a full duplex data transmission with the power supply control apparatus by photoelectric conversion.

It should be noted that information generating unit 211 is the same as or similar to the information generating units in the laser transmitter and the laser receiver in the above-mentioned preferred embodiment. The information transceiving unit 212 includes but is not limited to a reception printed circuit board (PCB), and an application specific integrated circuit (ASIC), a field programmable gate array (FPGA), a digital signal processor (DSP) or an embedded equipment, etc. In a preferred embodiment of the present invention, the information transceiving unit 212 is preferably the reception printed circuit board. Certainly, those skilled in the art may understand that the drive transmitting printed circuit board is merely a preferred embodiment of an aspect of information transceiving unit 212. Other existing or future possible information transceiving units 212 applicable to the present invention shall also fall within the scope of the present invention and be included herein by reference. In the above preferred embodiments of the present invention, the information generating unit in the laser receiver in laser transceiving apparatus 21 generates related ranging information based on the projection beam and the corresponding reflection beam, and then transmits the related ranging information to the laser transmitter which processes the related ranging information and transmits it to the reception printed circuit board in laser transceiving apparatus 21. The reception printed circuit board performs full duplex data transmission with the power supply control apparatus by photoelectric conversion.

Further, information transceiving unit 212 includes a first light emitting component for generating first optical signals based on the related ranging information to the power supply control apparatus; a first photosensitive component for acquiring second optical signals transmitted by the power supply control apparatus based on the transmission control information and converting into corresponding control electrical information. The transmission control information is used to control the laser transceiving apparatus to transmit the projection beam to the target to be measured.

For example, the first light emitting component generates first optical signals based on the related ranging information. First optical signals are optical signals of different spectrums, used to be transmitted to the power supply control apparatus in the form of optical signals. The first photosensitive component acquires second optical signals transmitted by the power supply control apparatus based on transmission control information and converts the second optical signals into corresponding control electrical information. The second optical signals are optical signals of different spectrums generated based on the transmission control information and are used for transmitting signals to the laser transceiving apparatus. The optical signals of different spectrums and the photosensitive component do not interfere with each other at the same time, realizing the full duplex wireless data transmission between information transceiving unit 212 and laser transceiving apparatus 21.

It should be noted that the first light emitting component includes but is not limited to an injection semiconductor light emitting component, a semiconductor laser component and a photoelectric coupled component. The injection semiconductor light emitting component includes a light emitting diode (LED), a nixie tube, a symbol tube, a star-shaped tube or matrix tube, etc. In a preferred embodiment of the present invention, the first light emitting component is preferably a light emitting diode (LED). Certainly, those skilled in the art may understand that the light emitting diode (LED) is merely a preferred embodiment of an aspect of the first light emitting component. Other existing or future possible the first light emitting components applicable to the present invention shall also fall within the scope of the present invention and be included herein by reference.

It should be noted that the first photosensitive component includes but is not limited to a photoresistance, a photosensitive diode and a photosensitive audion. In a preferred embodiment of the present invention, the first photosensitive component is preferably a photosensitive diode. Certainly, those skilled in the art may understand that the photosensitive diode is merely a preferred embodiment of an aspect of the first photosensitive component. Other existing or future possible the first photosensitive components applicable to the present invention shall also fall within the scope of the present invention and be included herein by reference.

Further, power supply control apparatus 23 includes a second light emitting component for transmitting the second optical signals to the laser transceiving apparatus, and a second photosensitive component for acquiring the first optical signals and converting into correspondingly related ranging electrical information.

It should be noted that the correspondingly related ranging electrical information in the embodiment of the present invention includes but is not limited to the electrical information obtained after processing based on the ranging information. The electrical information corresponding to the status information when the laser transceiving apparatus is operating and the electrical information corresponding to the rotation speed during rotation of the rotation apparatus. Certainly, those skilled in the art may understand that other existing or future possible correspondingly related ranging electrical information applicable to the present invention shall also fall within the scope of the present invention and be included herein by reference.

It should be noted that the second light emitting component includes but is not limited to an injection semiconductor light emitting component, a semiconductor laser component and a photoelectric coupled component. The injection semiconductor light emitting component includes a light emitting diode (LED), a nixie tube, a symbol tube, a star-shaped tube and a matrix tube, etc. In a preferred embodiment of the present invention, the second light emitting component is preferably a light emitting diode (LED). Certainly, those skilled in the art may understand that the light emitting diode (LED) is merely a preferred embodiment of an aspect of the second light emitting component. Other existing or future possible the second light emitting components applicable to the present invention shall also fall within the scope of the present invention and be included herein by reference.

It should be noted that the second photosensitive component includes but is not limited to a photoresistance, a photosensitive diode and a photosensitive audion. In a preferred embodiment of the present invention, the second photosensitive component is preferably a photosensitive diode. Certainly, those skilled in the art may understand that the photosensitive diode is merely a preferred embodiment of an aspect of the second photosensitive component. Other existing or future possible the second photosensitive components applicable to the present invention shall also fall within the scope of the present invention and be included herein by reference.

Figure 4:
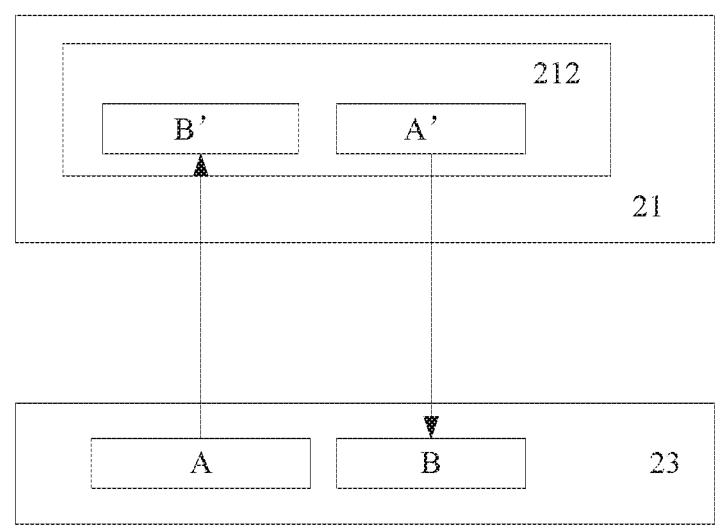
FIG. 4 is a structural view showing full duplex data transmission between the laser transceiving apparatus 21 and the power supply control apparatus 23 of the laser ranging device according to an aspect of the present invention.

FIG. 4 is a structural view showing full duplex data transmission between laser transceiving apparatus 21 and power supply control apparatus 23 of the laser ranging device according to an aspect of the present invention.

In the embodiments of the present invention, as shown in FIG. 4, the second light emitting component in power supply control apparatus 13 transmits second optical signals to the first photosensitive component in laser transceiving apparatus 21 based on the transmission control information of the projection beam transmitted by laser transceiving apparatus 21 to the target to be measured. The first photosensitive component in laser transceiving apparatus 21 converts the second optical signals into corresponding control electrical information so as to control laser transceiving apparatus 21 to transmit projection beam to the target to be measured. At the same time, the first light emitting component in laser transceiving apparatus 21 generates first optical signals based on the related ranging information generated by the projection beam and the corresponding reflection beam, and transmits the first optical signals to the second photosensitive component in power supply control apparatus 23. The second photosensitive component converts the first optical signals into correspondingly related ranging electrical information, realizing the full duplex wireless data transmission between laser transceiving apparatus 21 and power supply control apparatus 23. Compared to the single duplex data transmission, the response of the rangefinder is faster, and the physical contact of the traditional wired slip ring is avoided, thus effectively improving the service life of the laser ranging device.

In the above-mentioned preferred embodiments of the present invention, the second light emitting diode in power supply control apparatus 23 transmits the second optical signals to the first photosensitive diode in laser transceiving apparatus 21 based on the transmission control information of the projection beam transmitted by controlled laser transceiving apparatus 21 to the target to be measured. The first photosensitive diode converts the second optical signals into corresponding control electrical information so as to control laser transceiving apparatus 21 to transmit the projection beam to the target to be measured. Meanwhile, the first light emitting diode in laser transceiving apparatus 21 generates first optical signals based on the related ranging information generated by the projection beam and the corresponding reflection beam, and transmits the first optical signals to the second photosensitive diode in power supply control apparatus 23. The second photosensitive diode converts the first optical signals into correspondingly related ranging electrical information, realizing the full duplex wireless data transmission between laser transceiving apparatus 21 and power supply control apparatus 23. Compared to the single duplex data transmission, the response of the rangefinder is faster, and the friction and extrusion of physical contact of the traditional wired slip ring is avoided, thereby effectively improving the service life of the laser ranging device.

Further, the laser ranging device includes data transmission apparatus 24 for transmitting related ranging electrical information received by the power supply control apparatus to the external device and transmitting the governing signal transmitted by the external device to the power supply control apparatus to control the power supply control apparatus to regulate the rotation speed of the rotation apparatus based on the governing signal.

It should be noted that data transmission apparatus 24 include but is not limited to a data transmission line. The data transmission line includes a bi-directional multi-channel data line, a bi-wire transmission line, a microstrip transmission line, a waveguide transmission line, a surface wave transmission line, and an optical fiber, etc., or the data transmission line includes a data input line and a data output line. In a preferred embodiment of the present invention, the data transmission apparatus 24 is preferably a bi-directional multi-channel data line which may output signals as well as input signals. Data transmission apparatus 24 inputs the governing signal through independent channels, and output related ranging electrical information received by the power supply control apparatus to the external device. Certainly, those skilled in the art may understand that the bi-directional multi-channel data line is merely a preferred embodiment of an aspect of data transmission apparatus 24. Other existing or future possible data transmission apparatuses 24 applicable to the present invention shall also fall within the scope of the present invention and be included herein by reference.

In the above-mentioned preferred embodiments of the present invention, the data output line in the laser ranging device converts the first optical signals received by the second photosensitive diode in power supply control apparatus 23 into correspondingly related ranging electrical information and transmits to the external device through the bi-directional multi-channel data line. The data output line transmits the governing signal sent by the external device to the drive transmitting printed circuit board in power supply control apparatus 23 to control the drive transmitting printed circuit board in power supply control apparatus 23 to regulate the rotation speed of the rotation platform in rotation device 22 through the fixed platform based on the governing signal.

Further, the laser ranging device includes a power supply apparatus 25 of the laser transceiving apparatus. The power supply apparatus 25 of the laser transceiving apparatus acquires the alternating current provided by the power supply control apparatus and supplies power to the laser transceiving apparatus based on the alternating current.

Preferably, power supply apparatus 25 of the laser transceiving apparatus includes an outer coil and an inner coil. The outer coil is fixed to the power supply control apparatus and used for acquiring the alternating current provided by the power supply control apparatus. The inner coil is fixed to the laser transceiving apparatus for being electrically connected to the laser transceiving apparatus. The inner coil generates an induced electromotive force based on the induced electromagnetic field generated by the outer coil and supplies power to the laser transceiving apparatus.

In the above-mentioned preferred embodiments of the present invention, the outer coil acquires the alternating current provided by power supply control apparatus 23 and forms a changing magnetic field. The inner coil is electrically connected to laser transceiving apparatus 21, and generates an induced electromagnetic field based on the changing magnetic field of the outer coil, and generates an induced electromotive force based on the induced electromagnetic field to supply power for laser transceiving apparatus 21, realizing that power supply apparatus 25 of the laser transceiving apparatus performs wireless power supply for laser transceiving apparatus without mechanical contact, thereby solving the problem that the slip ring power supply shortens the service life of the laser ranging device, and effectively improves the service life of the laser ranging device.

Further, power supply control apparatus 23 includes a rotation speed regulation unit for regulating a speed control signal provided for rotation apparatus 22 to control the rotation speed of the rotation apparatus.

It should be noted that the rotation speed regulation unit can include but not limited to a drive hardware parameter module, a frequency converter governing, a speed setting controller, and a speed regulation motor. The drive hardware parameter module includes a drive resistance parameter unit, a drive pulse width speed regulation unit, etc. In a preferred embodiment of the present invention, the rotation speed regulation unit is preferably a drive resistance parameter unit. Certainly, those skilled in the art may understand that the drive resistance parameter unit is merely a preferred embodiment of an aspect of the rotation speed regulation unit. Other existing or future possible rotation speed regulation units applicable to the present invention shall also fall within the scope of the present invention and be included herein by reference.

It should be noted that the speed control signal includes but is not limited to a signal of pulse width modulation waveform (PWM waveform). In a preferred embodiment of the present invention, the signal of pulse width modulation waveform (PWM waveform) is preferably a speed control signal. Certainly, those skilled in the art may understand that the signal of pulse width modulation waveform (PWM waveform) is merely a preferred embodiment of an aspect of the speed control signal. Other existing or future possible speed control signals applicable to the present invention shall also fall within the scope of the present invention and be included herein by reference.

In the above-mentioned preferred embodiments of the present invention, the drive resistance parameter unit in power supply control apparatus 23 regulates the speed control signal provided by rotation apparatus 22 by changing the resistance value, to obtain pulse width modulation waveforms (PWM waveforms) of different duty ratios to control the rotation speed of rotation apparatus 22.

Further, power supply control apparatus 23 includes a switch unit for switching the regulation mode of the rotation speed of the rotation apparatus.

It should be noted that the switch unit includes but not limited to a micro switch, a rocker switch, a toggle switch, a slide switch, a button switch, a key switch, a membrane switch, and a point switch. In a preferred embodiment of the present invention, the switch unit is preferably a slide switch. Certainly, those skilled in the art may understand that the slide switch is merely a preferred embodiment of an aspect of the switch unit. Other existing or future possible switch units applicable to the present invention shall also fall within the scope of the present invention and be included herein by reference.

In the above-mentioned preferred embodiments of the present invention, the regulation mode of the rotation speed of the rotation platform in rotation apparatus 22 is switched by pushing the slide switch.

In the embodiments of the present invention, the regulation mode of the rotation speed of the rotation platform in rotation apparatus 22 includes but is not limited to the mode that data transmission apparatus 24 transmits the governing signal sent by the external device to power supply control apparatus 23 to control the power supply control apparatus 23 to regulate the rotation speed of the rotation apparatus based on the governing signal. The rotation speed regulation unit in power supply control apparatus 23 regulates the governing signal supplied to rotation apparatus 22 to control the rotation speed of the rotation apparatus. Certainly, those skilled in the art may understand that other existing or future possible regulation modes of the rotation speed of the rotation platform of rotation apparatus 22 applicable to the present invention shall also fall within the scope of the present invention and be included herein by reference.

Further, the laser ranging device includes wired power supply apparatus 26 for supplying power to the power supply control apparatus.

It should be noted that wired power supply apparatus 26 includes but is not limited to a wired power supply line. The wired power supply line includes an optical cable power supply line and an optical fiber power supply line. In a preferred embodiment of the present invention, wired power supply apparatus 26 is preferably a wired power supply line. Certainly, those skilled in the art may understand that the wired power supply line is merely a preferred embodiment of an aspect of wired power supply apparatus 26. Other existing or future possible wired power supply apparatuses 26 applicable to the present invention shall also fall within the scope of the present invention and be included herein by reference.

FIG. 2 shows the laser ranging device of a preferred embodiment using electromagnetic induction transmission mode 1 provided by an aspect of the present invention. The device includes laser transmission and reception apparatus 1, reception printed circuit board 2, inner coil and outer coil 3, rotation platform 4, bearing 5, fixed platform 6, drive transmitting printed circuit board 7, wired power supply line 8, top cover 9, magnetic pole 10, stator coil 11, bottom shell 12, bi-directional multi-channel data line 13 and slide switch 14.

As shown in FIG. 2, wired power supply line 8 in the laser ranging device is arranged on drive transmitting printed circuit board 7 for supplying power to drive transmitting printed circuit board 7. The drive transmitting printed circuit board is fixedly provided with the outer coil of inner coil and outer coil 3. The outer coil of inner coil and outer coil 3 acquires the alternating current supplied by drive transmitting printed circuit board 7 and forms a changing magnetic field. The outer coil of inner coil and outer coil 3 is electrically connected to the drive transmitting printed circuit board 7. The inner coil of inner coil and outer coil 3 generates the induced electromotive force based on the changing magnetic field of the outer coil, and generates an induced electromotive force based on the induced electromagnetic field to supply power to reception printed circuit board 2. Reception printed circuit board 2 is fixedly provided with laser transmission and reception apparatus 1 and electrically connected to laser transmission and reception apparatus 1 drive transmitting. By doing so, the wireless power supply for laser transmission and reception apparatus 1 without mechanical contact though inner coil and outer coil 3 is achieved, thereby solving the problem that the service life of the laser ranging device is short due to the physical contact power supply of the slip ring, and effectively improving the service life of the laser ranging device.

As shown in FIG. 2, when the distance of the target is to be measured, drive transmitting printed circuit board 7 acquires transmission control information for controlling the laser transmission and reception apparatus to transmit the projection beam to the target to be measured, and converts the transmission control information into second optical signals in different spectral forms through the light emitting diodes in drive transmitting printed circuit board 7. The second optical signals are transmitted to reception printed circuit board 2 by wireless transmission through the hollow parts of the loops in inner coil and outer coil 3. The photosensitive diode in reception printed circuit board 2 converts the second optical signal into corresponding control electrical information and transmits the corresponding control electrical information to the laser transmitter in laser transmission and reception apparatus 1. The laser transmitter in laser transmission and reception apparatus 1 transmits the projection beam to the target to be measured based on the corresponding control electric information. The laser receiver in laser transmission and reception apparatus 1 receives the reflection beam reflected by the target to be measured, generates related ranging information based on the projection beam and the corresponding reflection beam, and transmits the related ranging information to the light emitting diode in reception printed circuit board 2. The light emitting diode in reception printed circuit board 2 generates the first optical signals in different spectral forms based on the related ranging information and transmits it to drive transmitting printed circuit board 7. The photosensitive diode in drive transmitting printed circuit board 7 converts the first optical signals into corresponding ranging electrical information, and transmits the corresponding ranging electrical information in the drive transmitting printed circuit board 7 to the external device through data output line 13 so as to achieve the purpose of measuring the distance of the target to be measured by using the laser, realizing the full duplex wireless data transmission between reception printed circuit board 2 and drive transmitting printed circuit board 7, avoiding the friction and compression of physical contact of the traditional wired slip ring, thereby effectively improving the service life of the laser ranging device.

As shown in FIG. 2, the stator coil is fixedly connected to fixed platform 6 for acquiring the regularly changing alternating current which drive transmitting printed circuit board 7 provides for fixed platform 6. The fixed platform 6 is connected to the rotation platform 4 in a fitting manner by bearing 5. Stator coil 11 generates the induced magnetic field through the electromagnetic induction principle, and couples with magnetic pole 10 to form a torque force, realizing an electromagnetic induction transmission mode to drive magnetic pole 10 to rotate. Magnetic pole 10 is fixedly connected to rotation platform 4 for driving rotation platform 4 to rotate by the magnetic pole rotated by the electromagnetic induction transmission mode. Laser transmission and reception apparatus 1 is fixedly connected to the rotation platform 4 for being driven to rotate together through the rotating magnetic pole 10, avoiding the shortcomings of short service life, noisy, and large volume caused by the belt transmission mode or the gear transmission mode, effectively increasing the service life of the laser ranging device, reducing the volume of the laser ranging device and avoiding the noise, thereby achieving the effect of environmental protection.

When the speed of rotation platform 4 is to be regulated, in one aspect of the present invention, the governing signal transmitted by the external device is transmitted through the drive transmitting printed circuit board 7 to control rotation platform 4 to regulate the rotation speed of the rotation apparatus based on the governing signal. In another aspect of the present invention, the drive resistance parameter unit in drive transmitting printed circuit board 7 regulates the speed control signal provided by rotation platform 4 by changing the resistance value to obtain pulse width modulation waveforms (PWM waveforms) of different duty ratios to control the rotation speed of the rotation platform 4.

In the above-mentioned preferred embodiments of the present invention, bottom shell 12 is provided with a small hole inward for arranging slide switch 14 on drive transmitting printed circuit board 7, and the regulation mode of the rotation speed of rotation platform 4 is switched by sliding slide switch 14.

Optionally, the top cover is located outside laser transmission and reception apparatus 1 for protecting laser transmission and reception apparatus 1.

Compared with the prior art, the laser ranging device provided by an aspect of the present invention includes a laser transceiving apparatus, a rotation apparatus, and a power supply control apparatus. The laser transceiving apparatus is used for transmitting the projection beam to the target to be measured and receiving the reflection beam reflected by the target to be measured. Due to the structure design without a reflector, the problems of the reflectivity of the reflector itself and the angle offset of the reflection beam are avoided, and the light utilization is effectively improved. The rotation apparatus drives the laser transceiving apparatus to rotate by electromagnetic induction transmission, which replaces the design structure of the belt transmission mode or the gear transmission mode, so that the laser ranging device is smaller in size. The power supply control apparatus abandons the power supply mode of the slip ring with physical contact and wirelessly supplies power to the rotation apparatus without mechanical contact, increasing the service life of the laser ranging device. The power supply control apparatus transmits data with the laser transceiving apparatus by photoelectric conversion, thereby avoiding the short service life of the slip ring power supply and data transmission in the prior art, effectively increasing the service life of the laser ranging device, and realizing full duplex wireless data transmission between the power supply control apparatus and the laser transceiving apparatus by photosensitive components of different spectrums.

Certainly, it is apparent to those skilled in the art that the present invention is not limited to the details of the exemplary embodiments described above, and that the present invention can be embodied in other specific forms without departing from the spirit or essential characteristics of the present invention. Therefore, in all aspects, the embodiments should be considered as exemplary and nonrestrictive, the scope of the present invention is defined by the appended claims rather than the foregoing description, therefore, it is intended that all changes which fall within the meaning and range of equivalents of the claims are included in the present invention.

Any reference numeral in the claims should not be regarded as limiting the involved claims.

What is claimed is:

1. A laser ranging device, comprising:
a laser transceiving apparatus,
a rotation apparatus, and
a power supply control apparatus, wherein
the laser transceiving apparatus is used for transmitting a projection beam to a target to be measured and receiving a reflection beam reflected by the target to be measured,
the rotation apparatus is configured to drive the laser transceiving apparatus to rotate by electromagnetic induction transmission, and the rotation apparatus comprises a stator coil, a rotor, a fixed unit and a rotation unit, wherein
the stator coil is fixedly connected to the fixed unit,
the stator coil is configured to rotate the rotor by using an alternating current provided by the power supply control apparatus, wherein the rotor rotates by electromagnetic induction transmission, and the rotation unit is fixedly connected to the rotor and the laser transceiving apparatus to drive the laser transceiving apparatus to rotate, the fixed unit is connected to the rotation unit in a fitting manner by a bearing, wherein the fixed unit and the rotation unit cooperate to form an enclosure around the stator coil and the rotor, and the power supply control apparatus wirelessly supplies power to the rotation apparatus and transmits data with the laser transceiving apparatus by photoelectric conversion.

2. The laser ranging device according to claim 1, wherein the rotation apparatus further comprises a rotation number calculation unit for obtaining a rotation number of the rotation apparatus and calculating a rotation speed of the rotation apparatus based on the rotation number.

3. The laser ranging device according to claim 2, wherein the rotation number calculation unit comprises a cooperation calculation unit between the gear and an encoding calculation unit, the rotation number calculation unit comprising encoding teeth arranged on the fixed unit, and wherein the encoding teeth comprise at least one of group consisting of square encoding teeth, rectangular encoding teeth, conical encoding teeth, polygonal encoding teeth, and circular encoding teeth.

4. The laser ranging device according to claim 1, wherein the laser transceiving apparatus comprises an information generating unit for generating related ranging information based on the projection beam and a corresponding reflection beam, and an information transceiving unit for performing a full duplex data transmission with the power supply control apparatus by photoelectric conversion.

5. The laser ranging device according to claim 4, wherein the information transceiving unit comprises a first light emitting component for generating a first optical signal based on the related ranging information to the power supply control apparatus, and a first photosensitive component for acquiring a second optical signal transmitted by the power supply control apparatus based on transmission control information and converting into corresponding control electrical information, the transmission control information is used to control the laser transceiving apparatus to transmit the projection beam to the target to be measured.

6. The laser ranging device according to claim 5, wherein the power supply control apparatus comprises a second light emitting component for transmitting the second optical signal to the laser transceiving apparatus and a second photosensitive component for acquiring a first optical signal and converting into corresponding related ranging electrical information.

7. The laser ranging device according to claim 6, wherein the laser ranging device further comprises a data transmission apparatus for transmitting related ranging electrical information received by the power supply control apparatus to an external device and transmitting a governing signal transmitted by the external device to the power supply control apparatus to control the power supply control apparatus to regulate the rotation speed of the rotation apparatus based on the governing signal.

8. The laser ranging device according to claim 1, wherein the laser ranging device further comprises a power supply apparatus of the laser transceiving apparatus, and the power supply apparatus of the laser transceiving apparatus acquires the alternating current provided by the power supply control apparatus and supplies power to the laser transceiving apparatus based on the alternating current.

9. The laser ranging device according to claim 8, wherein the power supply apparatus of the laser transceiving apparatus comprises an outer coil and an inner coil, the outer coil is fixed on the power supply control apparatus for acquiring the alternating current provided by the power supply control apparatus, the inner coil is fixed on the laser transceiving apparatus for electrically connecting to the laser transceiving apparatus, the inner coil generates an induced electromotive force based on an induced electromagnetic field generated by the outer coil and supplies power to the laser transceiving apparatus.

10. The laser ranging device according to claim 1, wherein the power supply control apparatus further comprises a rotation speed regulation unit, the rotation speed regulation unit is used for regulating a speed control signal provided for the rotation apparatus to control the rotation speed of the rotation apparatus.

11. The laser ranging device according to claim 10, wherein the power supply control apparatus further comprises a switch unit for switching a regulation mode of the rotation speed of the rotation platform.

12. The laser ranging device according to claim 1, wherein the laser ranging device further comprises a wired power supply apparatus for supplying power to the power supply control apparatus.

13. The laser ranging device according to claim 1, wherein the laser transceiving apparatus does not include a mirror.

* * * * *